United States Patent
Pickles

(10) Patent No.: US 6,644,550 B1
(45) Date of Patent: Nov. 11, 2003

(54) ELECTRICAL CARD CONNECTOR HAVING BLOCKING MEANS

(75) Inventor: Charles S. Pickles, York, PA (US)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 10/188,543

(22) Filed: Jul. 3, 2002

(51) Int. Cl.$^7$ .............................. G06K 7/00; G06K 7/06
(52) U.S. Cl. ...................................... 235/486; 235/441
(58) Field of Search ................................. 235/486, 487, 235/441, 492, 375, 479, 360, 480; 439/159, 541.5; 361/799; 902/31

(56) References Cited

U.S. PATENT DOCUMENTS

| | | | | |
|---|---|---|---|---|
| 3,900,716 A | * | 8/1975 | Kawabata et al. | 235/460 |
| 4,150,784 A | * | 4/1979 | Moorman et al. | 235/479 |
| 4,421,237 A | * | 12/1983 | Cross, Jr. | 209/612 |
| 4,829,169 A | * | 5/1989 | Watanabe | 235/492 |
| 5,526,235 A | * | 6/1996 | Beason et al. | 361/799 |
| 6,105,861 A | * | 8/2000 | Kuit | 235/375 |
| 6,174,180 B1 | * | 1/2001 | Chen | 439/159 |
| 6,400,323 B2 | * | 6/2002 | Yasukawa et al. | 343/700 MS |
| 6,558,175 B1 | * | 5/2003 | Yu | 439/138 |
| 2002/0015002 A1 | * | 2/2002 | Yasukawa et al. | 343/895 |
| 2003/0085286 A1 | * | 5/2003 | Kelley et al. | 235/492 |

* cited by examiner

Primary Examiner—Thien M. Le
(74) Attorney, Agent, or Firm—Wei Te Chung

(57) ABSTRACT

An electrical card connector (100) adapted for engaging with a CardBus (800) includes a housing (1) with a plurality of terminals (2) received therein, a shell (3), and an ejector device (4) mounted on the housing. The shell defines a rectangular opening (331) in a side plate (33) thereof and a stamped spring finger (332) connecting with a forward edge of the opening and extending backwardly. The spring finger has a pair of stop protrusions (3324) formed thereon for preventing an undesired card, such as a smart card (900), from inserting into the connector.

12 Claims, 9 Drawing Sheets

ELECTRICAL CARD CONNECTOR HAVING BLOCKING MEANS

BACKGROUND OF THE INVENTION

1. Field of the Invention

The present invention relates to an electrical card connector, and particularly to an electrical card connector having a reliable blocking spring finger for preventing an undesired card from inserting into the card connector.

2. Description of Related Art

CardBus, the 32-bit high performance mastering architecture for PC card, was standardized by the Personal Computer Memory Card International Association (PCMCIA) in May 1996, the homepage of which is http://www.pcmcia.org/. It was conceived as a means to add high bandwidth capabilities to the PC Card technology and to match the system performance achieved by today's PCI bus-based mobile computers. The CardBus connected to a printed circuit board is through a CardBus connector, which is designed and manufactured according to the standard of the CardBus. Basically, a conventional card connector usually includes a housing with a plurality of terminals received therein, a shell enclosing the housing and an ejector. The related arts can be found in U.S. Pat. Pub. No. 2001/0046799A and U.S. Pat. Nos. 5,369,259, 6,129,571, 6,056,566 and 6,039,587. However, a mobile computer usually has a CardBus as well as a smart card which is thinner than the CardBus. The mobile computer provides a CardBus connector and a smart card connector to respectively accommodating the CardBus and the smart card. Possibly, a smart card may be incorrectly inserted into a conventional CardBus connector since the smart card is thinner than the CardBus, thereby damaging the smart card or the CardBus connector. So, it is desired to provide a CardBus connector having means for blocking a smart card from inserting into the CardBus connector.

Hence, an improved CardBus connector is required. It is noted that U.S. Pat. No. 6,068,516 with the same assignee as the invention, discloses an approach to prevent the desired card from being misoriented into the connector. Somewhat differently, the instant invention is to provide the anti-mismating device for blocking the undesired different (thickness) cards.

BRIEF SUMMARY OF THE INVENTION

Accordingly, a first object of the present invention is to provide an electrical card connector having a blocking means for protecting the electrical card connector from damages by an insertion of an electrical card which is not designed to be used with the electrical connector.

In order to achieve the above-mentioned object, an electrical card connector in accordance with the present invention includes a dielectric housing with a plurality of terminals arranged therein, a conductive shell covering the dielectric housing, an ejector device and a grounding plate for grounding purpose. The conductive shell comprises a cover plate and a pair of side plates extending vertically from opposite lateral edges of the cover plate. One of the two side plates provides a generally V-shaped spring finger that is stamped therefrom and thereby defining an opening therein. The V-shaped spring finger extends firstly inwards into a chamber for receiving an inserting card and then extends outwards until the one of side plates. The spring finger comprises a base portion connected with a forward edge of the opening, a triangular free end portion, and an intermediate portion connecting the base portion and the free end portion. The intermediate portion defines a pair of stop protrusions oppositely beside the free end portion and confronting an inserting direction of the inserting card for preventing a wrongly inserted undesired card from inserting into the electrical card connector.

Other objects, advantages and novel features of the invention will become more apparent from the following detailed description of the present embodiment when taken in conjunction with the accompanying drawings.

DETAILED DESCRIPTION OF THE INVENTION

Figure 1:
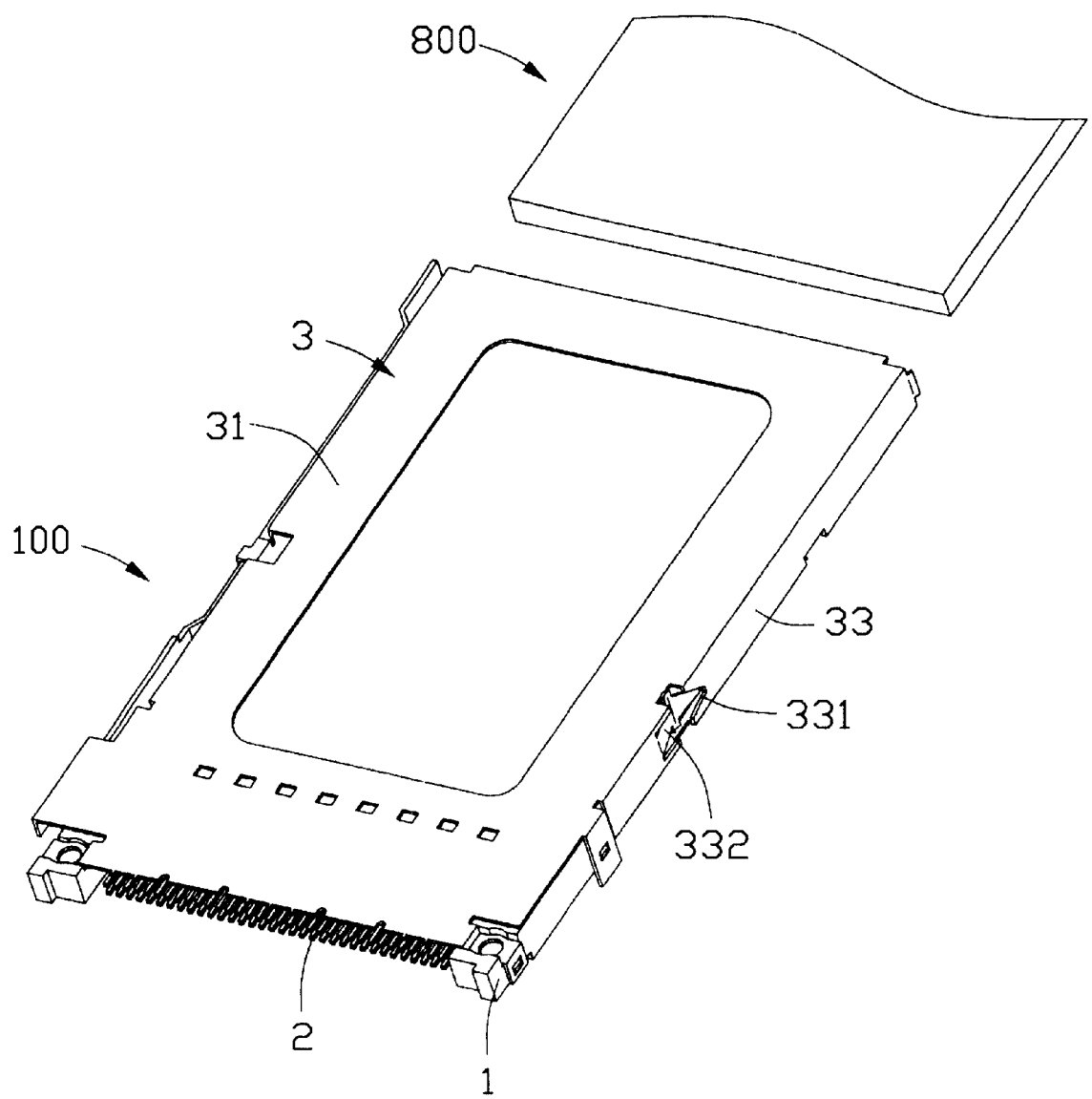
FIG. 1 is a perspective view of an electrical card connector in accordance with the present invention with a CardBus to be inserted thereinto.

Reference will now be made to the drawing figures to describe the present invention in detail.

Figure 2:
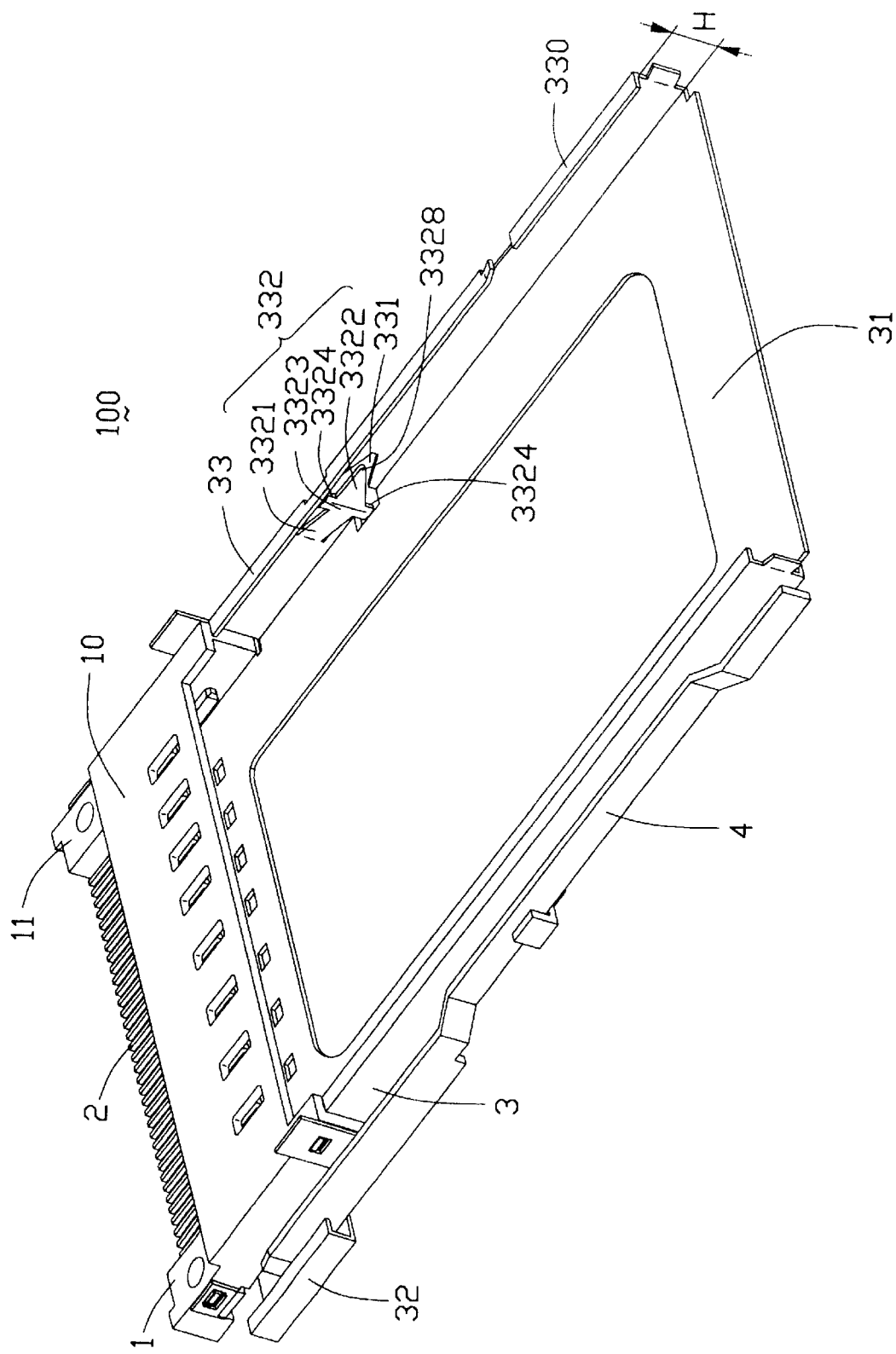
FIG. 2 is a perspective view of the electrical card connector shown in FIG. 1, from a bottom aspect.

Referring to FIGS. 1 and 2, the present invention is aimed to provide an electrical card connector 100 permitting a card bus 800 to be inserted into the connector 100 to electrically connect therewith, but preventing a card which is thinner than the card bus 800 from being inserted into the card connector 100 to damage terminals thereof. The electrical card connector 100 comprises a dielectric housing 1, a plurality of terminals 2, a conductive shell 3 attached to the dielectric housing 1, an ejector device 4, and a grounding plate (not shown).

Figure 3A:
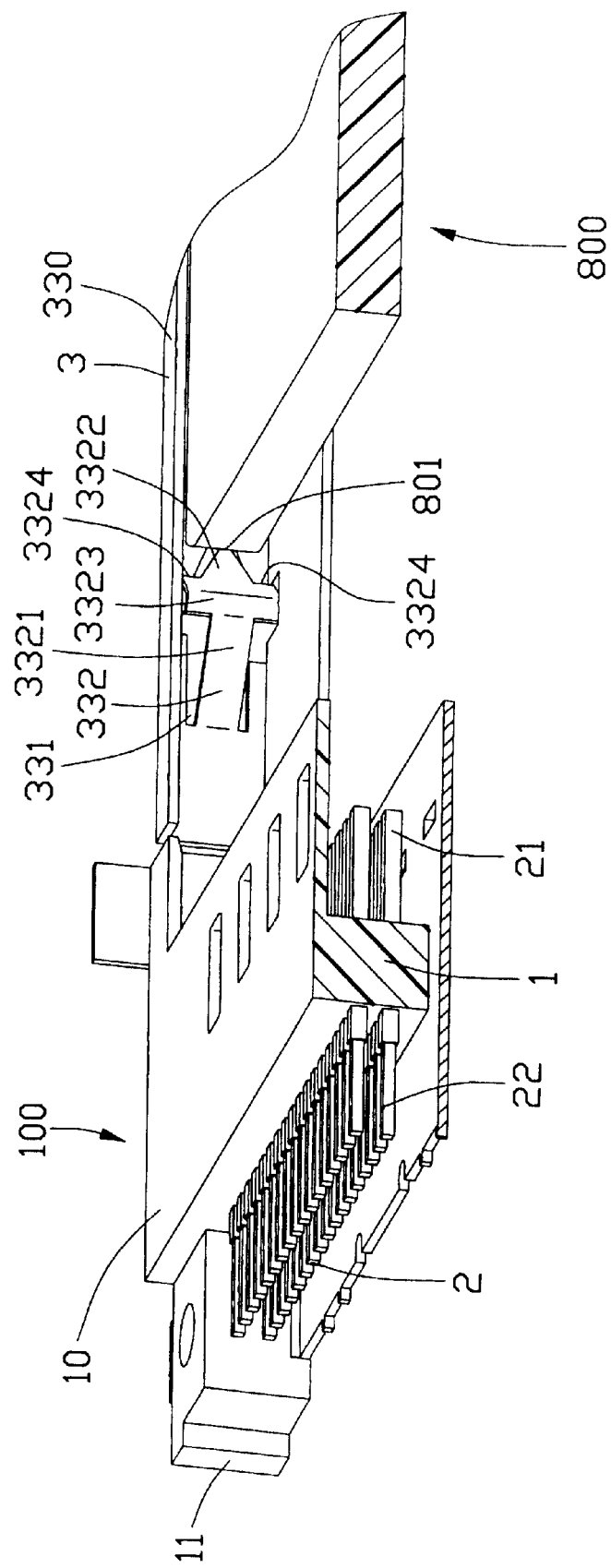
FIGS. 3A–3C illustrate, in a cross-sectional manner, an insertion process of the CardBus into the electrical card connector shown in FIGS. 1 and 2.
Figure 3B:
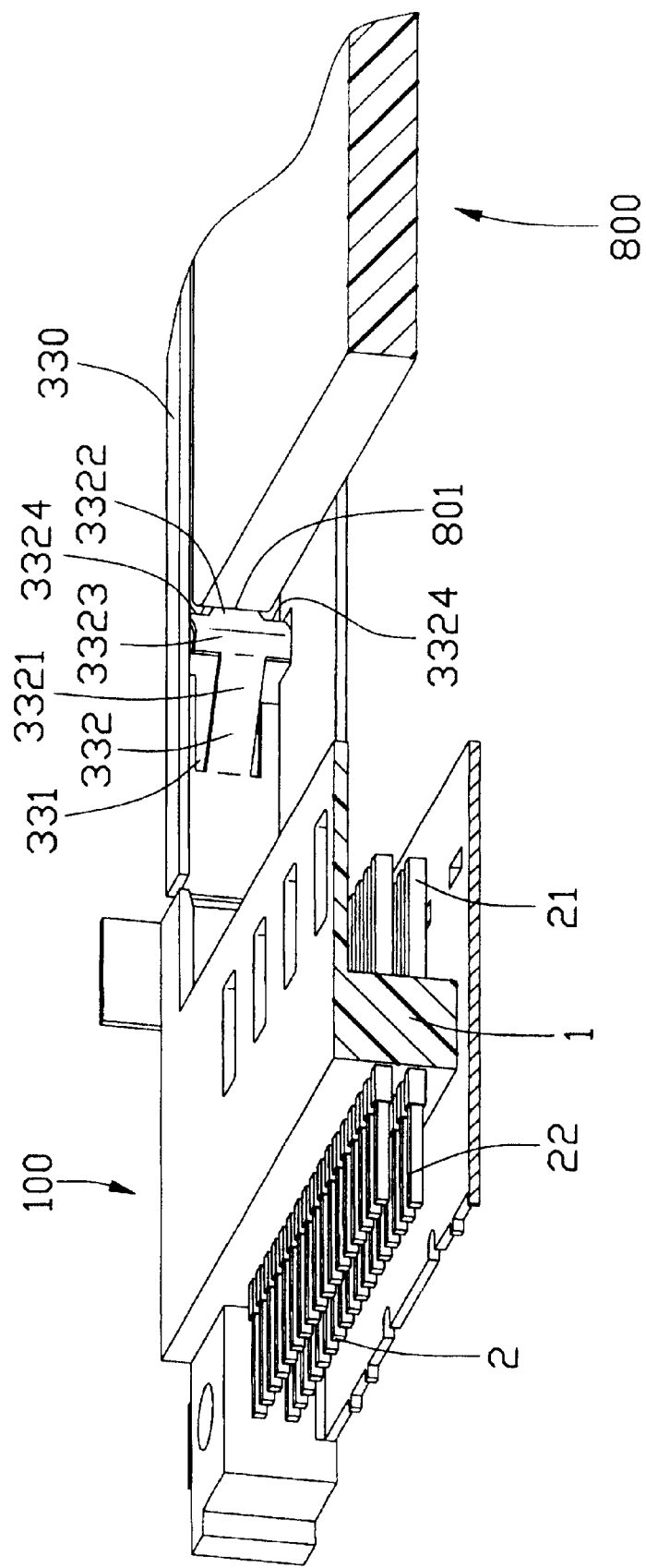
Figure 3C:
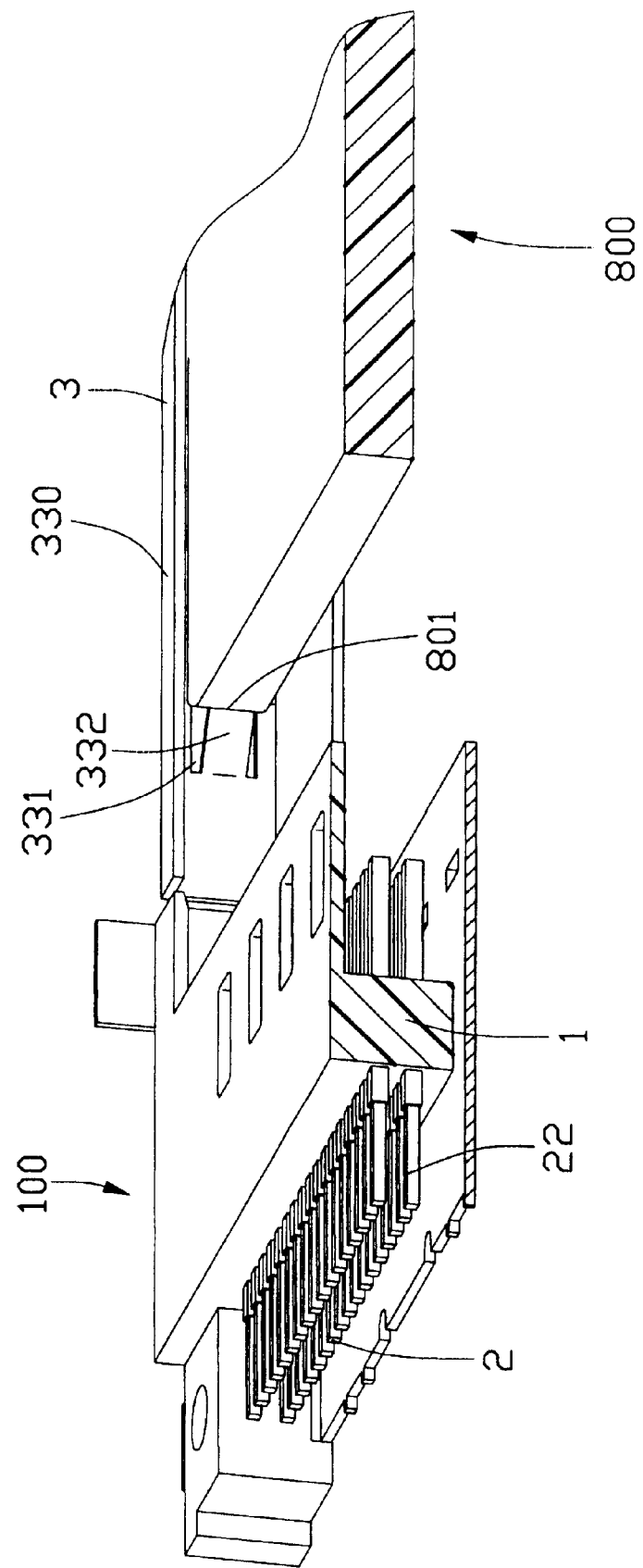
Figure 3D:
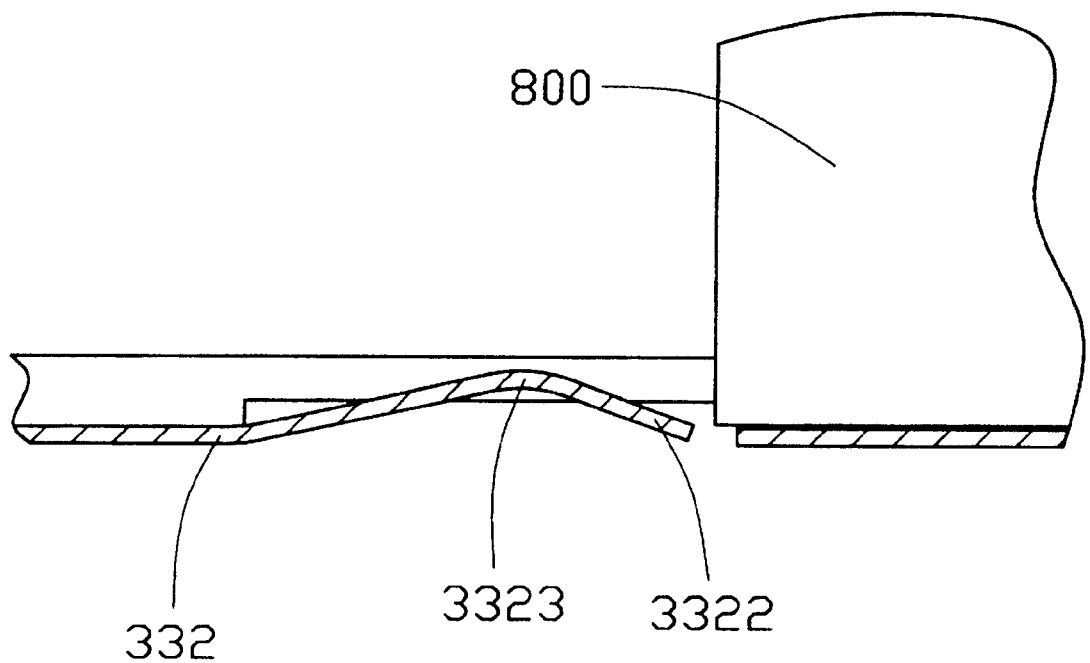
FIG. 3D is an enlarged, cross-sectional view illustrating relationship between a spring finger of the electrical card connector and the CardBus before the CardBus engages with the spring finger.

The dielectric housing 1 includes an elongated main body 10 and a pair of side arms 11 extending forwardly from opposite lateral sides of the main body 10. Turning to FIGS. 3A–3C, the plurality of terminals 2 received in the dielectric housing 1 each have a contacting portion 21 extending rearwards from a rear side of the main body 10 for electrical connection with contacts (not shown) of the card bus 800 and an engaging portion 22 extending forwards from a front side of the main body 10 for coupling with an adapter (not shown) which electrically connects the connector 100 with a printed circuit board (not shown).

Turning back to FIG. 1, the conductive shell 3 is stamped and formed from a metal sheet, and comprises a rectangular cover plate 31 and a pair of side plates 33 perpendicularly projecting from opposite lateral edges of the cover plate 31. The side plates 33 each form a flange 330 along a longitudinal bottom edge thereof. An opening 331 with a rear V-shaped cutout is substantially defined in a middle of one of the side plates 33. A spring finger 332 is formed by the one side plate 33, having a front end connecting with the side plate 33 and a body projecting from the front end into the opening 331. Together referring to FIGS. 1 and 2, the body of the spring finger 332 comprises an inwardly extending base portion 3321 connecting with the forward edge of the one side plate 33, an outwardly extending triangular free end portion (or an actuation portion) 3322, and an intermediate portion 3323 interconnecting the base portion 3321 and the triangular free end portion 3322. The triangular free end portion 3322 has a rear end received in the V-shaped cutout of the opening 331. The intermediate portion 3323 has a pair of stop protrusions 3324 formed on upper and lower edges thereof, respectively. The protrusions 3324 are located in a space of the connector 100 through which the card bus 800 is inserted to electrically connect with the terminals 2. The triangular free end portion 3322 has a pair of upper and lower bevel edges 3325 formed thereon for guiding a wrongly inserted card to be blocked by a corresponding one of the protrusions 3324, which will be described in detail hereinafter.

In use, as shown in FIGS. 3A–3D, when the card bus 800 is inserted into the electrical card connector 100 and extended through the spring finger 332 towards the dielectric housing 1 from a rear side of the spring finger 332, a lateral foremost edge 801 of the card bus 800 is first led by and slides on an inner surface of the triangular free end portion 3322. The lateral foremost edge 801 of the card bus 800 then deflects the spring finger 332 out of the inserted way and so that the movement of the card bus 800 is not hitched by the pair of stop protrusions 3324 of the intermediate portion 3323 because the card bus 800 has a thickness larger than a distance between a tip point 3328 (FIGS. 2 & 4C) of the triangular free end portion 3322 and an inner face of the flange 330 of the one side plate 33.

Figure 4A:
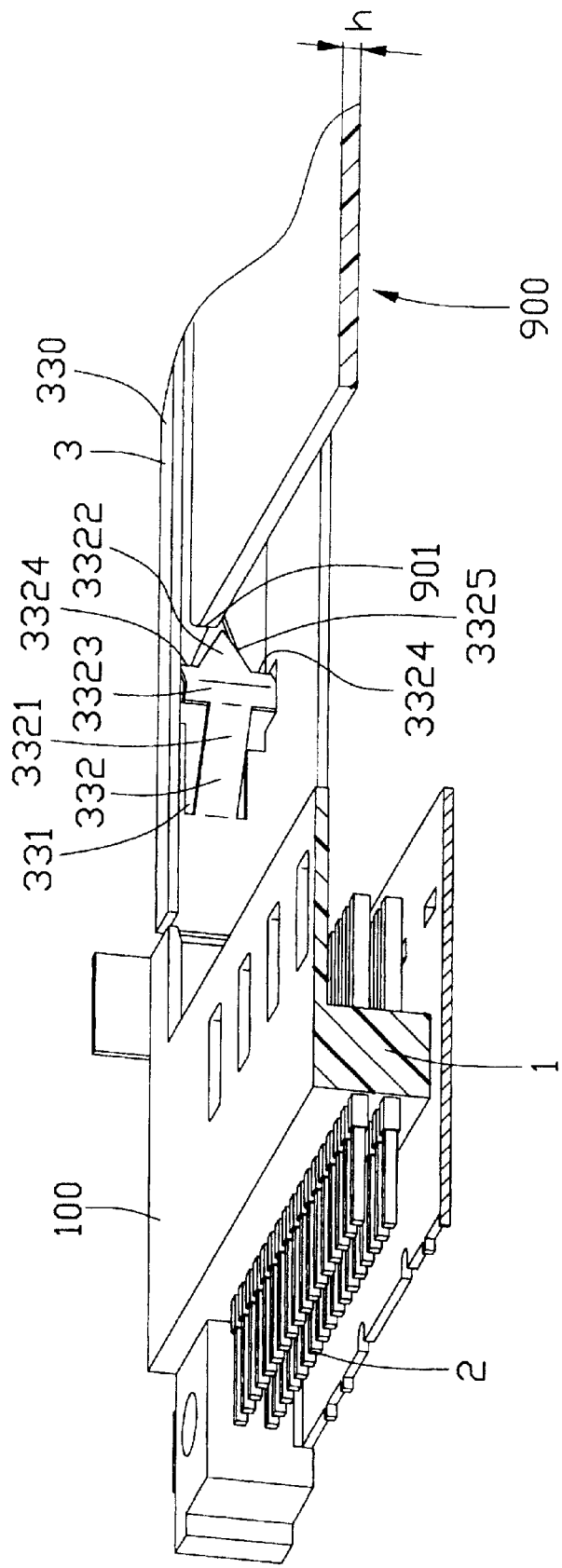
FIGS. 4A–4C illustrate an insertion process of a smart card, which is much thinner than the CardBus into the electrical card connector in accordance with the present invention.
Figure 4B:
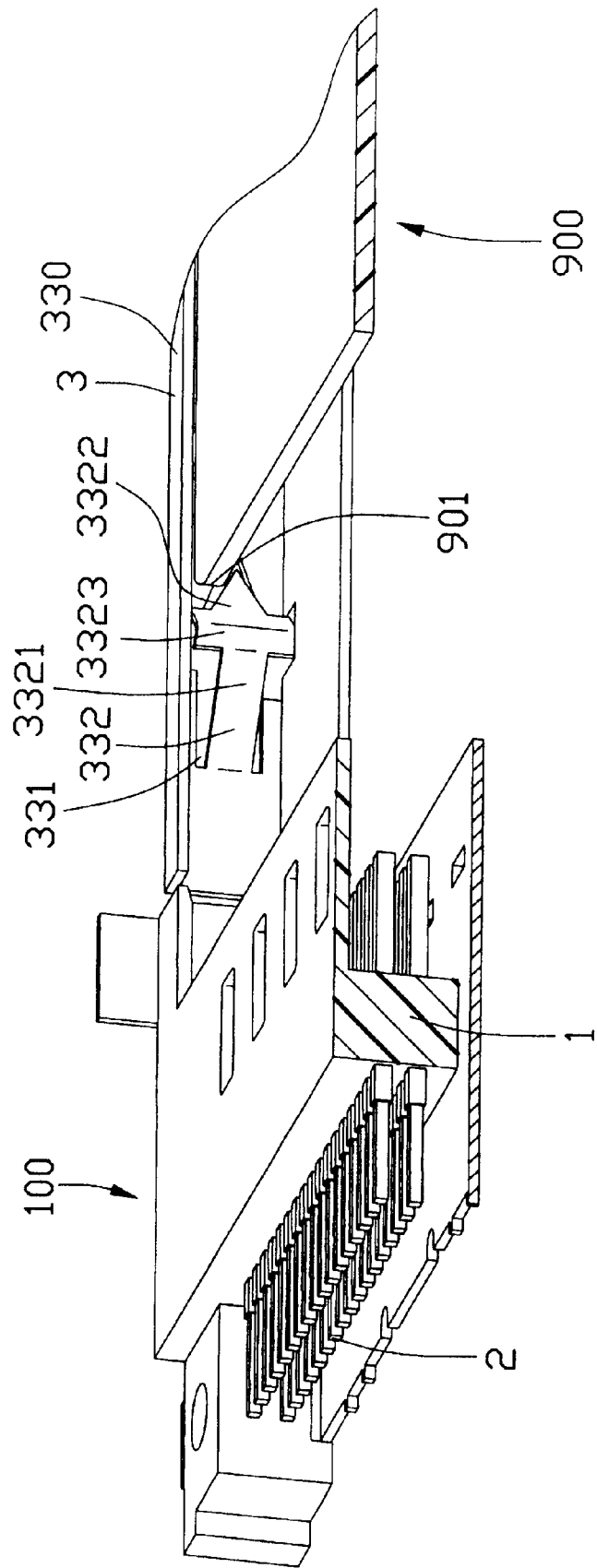
Figure 4C:
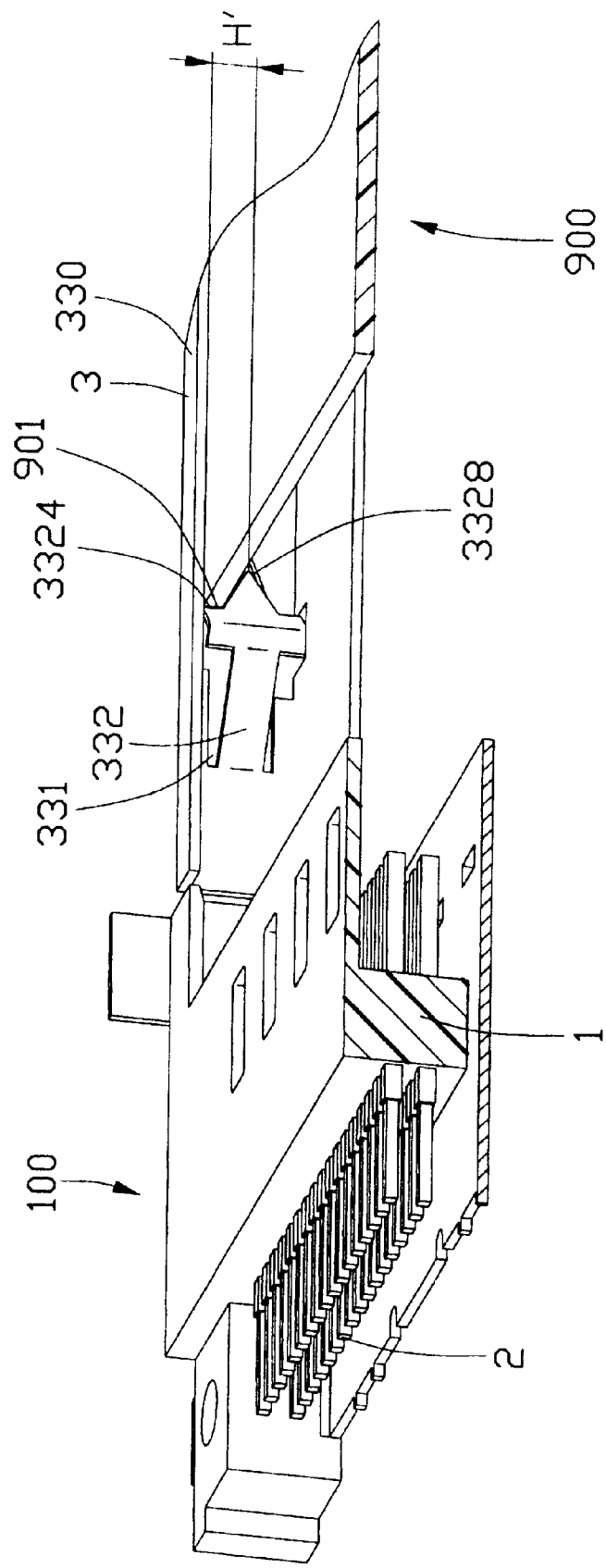

In order to explain how the connector 100 works to prevent a card not designed for use with the connector 100 from being wrongly inserted into the connector 100, a smart card which is much thinner than the card bus 800 is adopted as an example. Referring to FIGS. 4A–4C, once a smart card 900 is mistakenly inserted into the electrical card connector 100, the tip point 3328 will divert a lateral foremost edge 901 of the smart card 900 to move on the lower bevel edge 3325 of the triangular free end portion 3322 of the spring finger 332. The smart card 900 will move along the lower bevel edge 3325 of the free end portion 3322 until it is trapped by the lower stop protrusion 3324. Thus, the smart card 900 is prevented from moving through the spring finger 332 to damage or be damaged by the terminals 2. Specifically, in the illustrated embodiment, a height of one of the stop protrusions 3324 of the spring finger 332 is substantially equal to a thickness of the smart card 900. Still, the wrongly inserted card will be tucked between the lower bevel edge 3325 and the flange 330 of the side plate 33 even if the height of the stop protrusions 3324 is smaller than the thickness of the wrongly inserted card. Clearly, one of the bevel edges 3325 of the spring finger 332 performs as a guiding portion to lead the wrongly inserted card to move towards a corresponding one of the stop protrusions 3324 and cooperates with the flange 330 of the side plate 332 (as shown in the preferred embodiment) or the cover plate 31 to block the wrongly inserted card.

To illustrate the present invention more clearly, a distance from the tip point 3328 to the side plate 33 is labeled "H'" (FIG. 4C), a height between two opposite inner faces of the side plate 33 is labeled "H" (FIG. 2) while a thickness of the inserted smart card is labeled "h" (FIG. 4A). In the preferred embodiment, H' is half of H. When h<H', the card is blocked up during insertion; when H'<h<H, the card can be inserted into the connector; when h>H, the card cannot be inserted into the connector.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An electrical card connector adapted to electrically engage with a predetermined mating card but block an undesired card from inserting thereinto, the undesired card having a thickness smaller than that of the mating card, comprising:

a dielectric housing;

a plurality of terminals assembled to the dielectric housing;

a conductive shell shielding the dielectric housing; and a blocking device deflectably attached to the conductive shell, comprising a diverting portion with bevel guiding surface formed thereon and a hold-up portion, said guiding surface being adapted for leading the undesired card to move to be blocked by the hold-up portion.

2. The electrical card connector as described in claim 1, wherein said conductive shell has a pair of side plates oppositely projecting therefrom, said blocking device being formed on at least one of said pair of side plates.

3. The electrical card connector as described in claim 2, wherein said blocking device has an end connecting with said at lest one of said pair of side plates, said diverting portion being formed at a free end of said blocking device, and the diverting portion having a tip portion facing an insertion direction of the predetermined mating card or the undesired card.

4. The electrical card connector as described in claim 3, wherein said hold-up portion is a protrusion formed on one of upper and lower edges of the blocking device.

5. The electrical card connector as described in claim 4, wherein said at least one of side plates has an opening defined therein, said blocking device being outwardly deflectably attached to the at least one of side plate, the blocking device being located in the opening.

6. The electrical card connector as described in claim 3, wherein said side plates each have a flange formed therewith and a distance from said tip portion of said diverting portion to said flange is so predetermined that it is larger than the thickness of the undesired cart and smaller than the thickness of the predetermined mating card.

7. An electrical card connector, adapted for electrically connecting with a desired card having a predetermined thickness but blocking an undesired card from inserting thereinto, the undesired card being thinner than the desired card, comprising:

a dielectric housing with a plurality of terminals received therein; and a shell covering said dielectric housing, said shell having a spring finger integrally formed therewith, said spring finger having a guiding portion, a base portion connecting to said shell, and an intermediate portion interconnecting said guiding portion and said base portion, wherein said guiding portion and said base portion forms a V-shape relationship therebetween.

8. The electrical card connector as described in claim 7, wherein said spring finger has at least one protrusion projecting from said intermediate portion and confronting an insertion direction of the desired card or the undesired card for holding back a movement of the incautiously inserted undesired card.

9. The electrical card connector as described in claim 8, wherein said guiding portion defines a bevel guiding face for guiding the incautiously inserted undesired card to move to be blocked by said protrusion.

10. An electrical card connector for electrically connecting with a desired card having a predetermined first thickness but blocking an undesired card from inserting thereinto, the undesired card having a second thickness smaller than the first thickness, comprising:

a dielectric housing with a plurality of terminals received therein;

a space defined in front of said housing, with a first vertical dimension in compliance with the first thickness, for receiving the desired card in a front-to-back direction; and a spring finger disposed on one lateral side of said space, said spring finger including:

an oblique actuation portion invading the space; and a stop protrusion invading the space and being actuated to move along with said actuation portion, said stop protrusion providing an effective stop face with a second vertical dimension in compliance with the second thickness; wherein when the desired card is inserted into the space, the actuation portion is outwardly deflected and the stop protrusion is associatively outwardly moved not to block insertion of said desired card; oppositely, when the undesired card is inserted into the space, the actuation portion can not be actuated and the stop protrusion stays in the space for blocking said undesired card.

11. The connector as described in claim 10, wherein said spring arm is deflectable in a lateral direction of the connector.

12. The connector as described in claim 10, wherein said spring arm provides a bevel edge around said actuation portion to lead the undesired card to the stop protrusion.

* * * * *